A. H. DUNLAP.
STEERING WHEEL LOCK.
APPLICATION FILED AUG. 20, 1919.
1,438,102.
Patented Dec. 5, 1922.
2 SHEETS—SHEET 1.
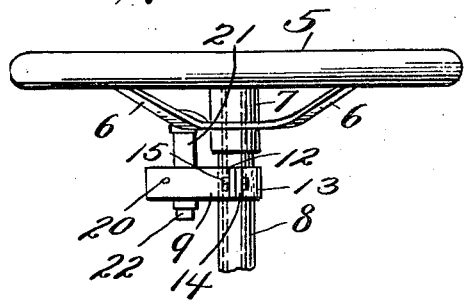
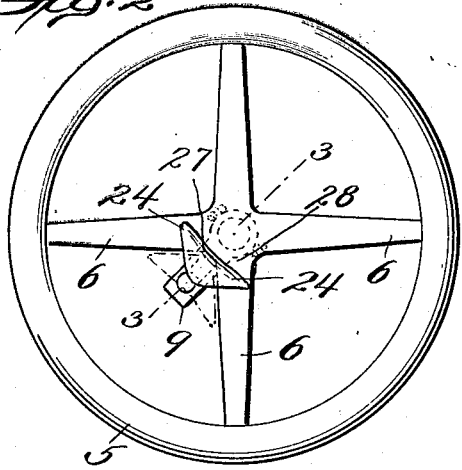
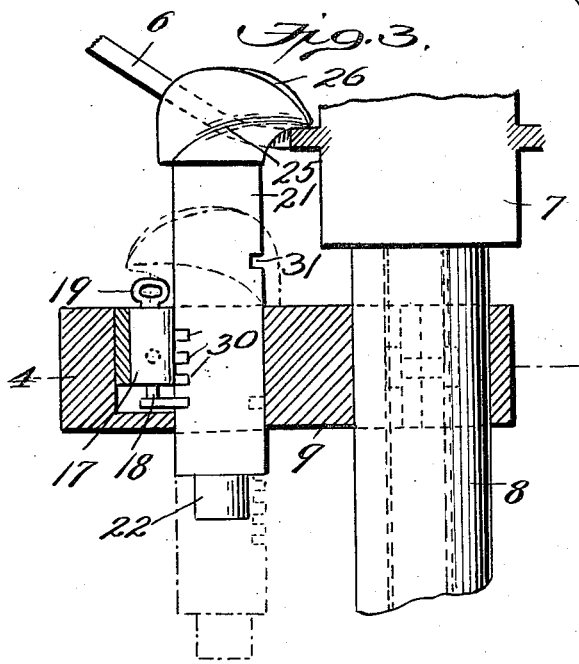
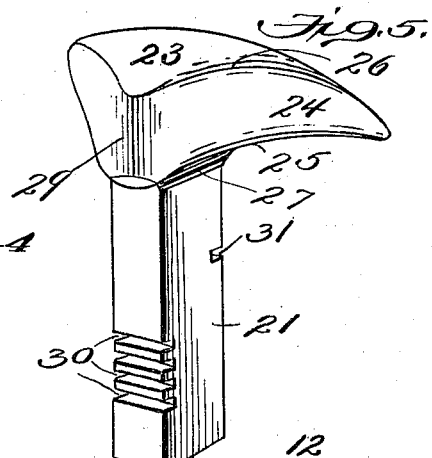
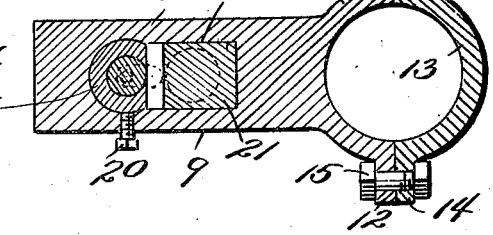
Witnesses:
Chas. S. Hoyer
Inventor
Alfonso H. Dunlap
by
Attorney A. H. DUNLAP.
STEERING WHEEL LOCK.
APPLICATION FILED AUG. 20, 1919.
1,438,102.
Patented Dec. 5, 1922.
2 SHEETS—SHEET 2.
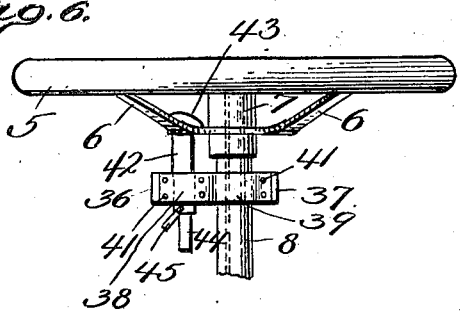
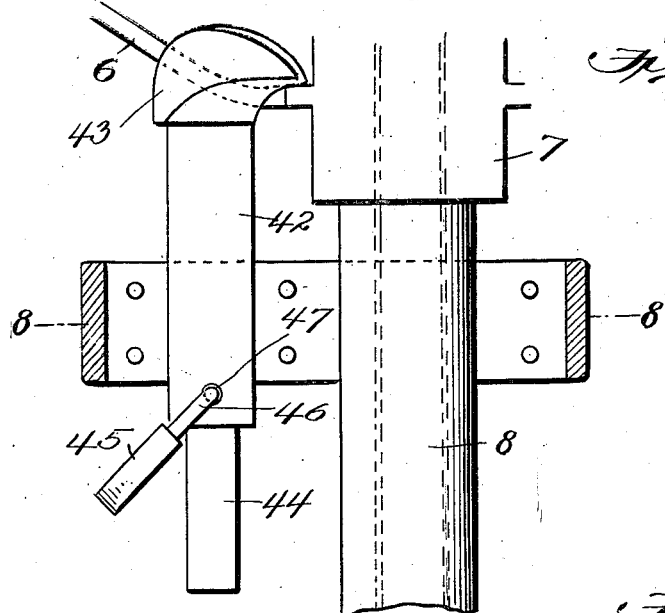
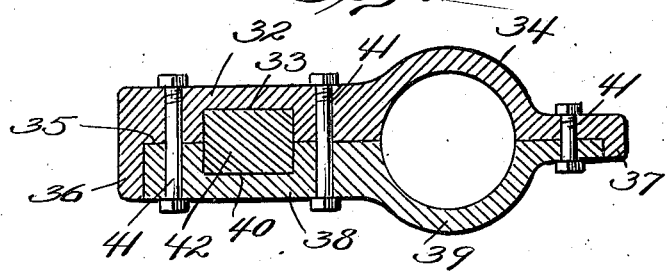
Witnesses:
Inventor
Alfonso H. Dunlap
by
Attorney Patented Dec. 5, 1922.

1,438,102

UNITED STATES PATENT OFFICE.

ALFONSO HOLMES DUNLAP, OF CHATTANOOGA, TENNESSEE.

STEERING-WHEEL LOCK.

Application filed August 20, 1919. Serial No. 318,798.

*To all whom it may concern:*

Be it known that I, ALFONSO HOLMES DUNLAP, a citizen of the United States, residing at Chattanooga, in the county of Hamilton and State of Tennessee, have invented new and useful Improvements in Steering-Wheel Locks, of which the following is a specification.

This invention relates to a steering wheel lock for an automobile or other steering wheel, and the primary object of the same is to provide a simple and effective means applicable to the steering column of an automobile or other mechanism of an analogous character whereby a steering wheel may be positively locked against rotation or movement by unauthorized persons and which may be applied without modifying either the usual structure of the steering wheel or column and capable of being disposed in inoperative position without in the least interfering with the operation of the steering wheel. With this and other objects and advantages in view the invention consists in the preferred construction and arrangements of the several parts which will be more fully hereinafter described and claimed.

In the drawings:—

Fig. 1 is a side elevation of a steering wheel and a portion of a steering column showing one form of the improved steering wheel lock and in position to secure the wheel against rotation.

Fig. 2 is a top plan view of a steering wheel and the improved locking attachment shown in locking position.

Fig. 3 is a transverse vertical section on an enlarged scale taken in the plane of the line 3—3, Fig. 2 and showing the attachment in locked position in full lines and in unlocked and in removed position relatively to the steering wheel in dotted lines.

Fig. 4 is a horizontal section through the attachment taken in the plane of the line 4—4, Fig. 3.

Fig. 5 is a detail perspective view of the locking head and stem or shank.

Fig. 6 is a side elevation of a steering wheel and a portion of a steering column showing a modified structure of the improved attachment.

Fig. 7 is an enlarged transverse vertical section similar to Fig. 3 illustrating a modified structure of the attachment shown by Fig. 6.

Fig. 8 is a horizontal section of the attachment taken in the plane of the line 8—8, Fig. 7.

The numeral 5 designates a steering wheel having the usual spokes 6 radiating from a hub 7, the hub 7 being secured as usual on a steering column 8. These well known parts may be of any approved form as the improved attachment may be applied to any type of wheel embodying radiating spokes and there may be any number of spokes. The improvement embodies essentially an attaching clamp 9 which, in the form of the improvement shown by Figs. 1 to 5, inclusive, consists of a member 10 of suitable thickness having a semi-circular yoked inner end 11 terminating in outstanding or angular apertured lugs or ears 12, and with the member 10 a semi-circular member 13 is employed also having outstanding or angular apertured lugs or ears 14, the yoked end 11 and the member 13 when assembled providing means for embracing and tightly securing the attachment at any elevation desired or found necessary on the steering column 8, as clearly shown by Figs. 1 and 3, the securing action of these members being rendered positive through the medium of nutted bolts 15 inserted through the apertured ears or lugs 12 and 14 as clearly shown by Fig. 4. The member 10 projects outwardly from the steering column and is practically solid with the exception of an angular slot 16 entirely therethrough from the top to the bottom, and arranged adjacent to an embedded lock 17 of the pin or well known Yale type and provided with a locking shank or tumbler 18 adapted to be turned into locking and unlocking position by means of a key 19 insertible in the top of the lock as shown by Fig. 3. The lock 17 is not in the least limited to any precise structure as it is proposed to use any type of this form of cylinder lock that is adapted to be manually concealed or embedded within the member 10 of the clamp and held in place, for instance, by the screw 20, though other means may be adopted for this purpose. The lock is so mounted that the movable bolt thereof may be projected into or withdrawn from the angular slot or opening 16 of the member 10 in a plane at right angles to the device adapted to be locked in the said slot or opening. The form of lock shown is employed simply to demonstrate one form of such device, and it should be understood that it is also proposed to place this lock in any position other than that shown, the only object sought being to provide means for locking the main wheel engaging element against movement relatively to the clamp and also to provide such form of lock as to render it difficult or practically impossible for unauthorized persons to open the lock and release the locking element from the steering wheel.

The locking element embodies a stem or shank 21 which is angular in cross section or of the same contour as that of the slot 16 and fits the latter with such degree of snugness that a vertical movement only of the angular portion of the said stem or shank is permitted when disengaged from the tumbler of the lock. The stem or shank 21 cannot be rotated in the slot 16 owing to the corresponding angularity of the said stem or shank and slot, but it is preferred that the lower extremity of the stem or shank 21 be cylindrically reduced as at 22 so that when the stem or shank is released from the lock 17 and drawn upwardly, it may be rotated within the slot 16. On the upper end of the stem or shank 21 is a locking head 23 which is preferably of an angular form or provided with tapering oppositely projecting angular arms 24 which are undercut or shaped to produce an upper curved beveled surface 25, the top surface of the head sloping downwardly as at 26 to the reduced edge of the head, the arms being united by an intermediate web as at 27. This web, together with the arms provide an inner bearing surface of considerable width to engage over and bear upon the web 28 connecting the wheel spokes 6 adjacent to the hub 7 and whereby the two arms 24 are disposed to also bear upon two spokes. From the foregoing it will be seen that the head 23 projects over one of the sides of the stem or shank 21 a maximum distance and the arms 24 extend outwardly from adjacent sides of the stem or shank and the projection of the head relatively to the remaining side of the stem or shank is minimized and shown shaped or curved as at 29 so that when said minimized portion 29 of the head is turned inwardly with relation to the web 28 connecting the wheel spokes 6, the arms 24 of the head 23 will entirely clear the said wheel spokes and by lowering the head 23 together with the stem or shank 21, the steering wheel 5 will be free for unrestricted rotation. The substantially triangular form of the head 23 also provides for a clearance of the arms 24 relative to the spokes 6 when the minimized projecting portion 29 of the head 23 is turned inwardly with relation to the center of the steering wheel. The stem or shank 21 has a plurality of slots 30 formed in one side edge near the lower end thereof for engagement with the tumbler of the lock 17 and whereby the said stem or shank may be secured at varying elevations relatively to the member 10, the slots 30 being engaged by the lock tumbler when the head 23 is turned so that the arms 24 will extend over the wheel spokes 6 as shown by Fig. 2. When the head 23 is released from the wheel spokes 6, the lock tumbler is operated to clear the slot 30 with which it may have been in engagement and the stem or shank 21, together with the head 23, is raised sufficiently to permit the reduced portion of the stem or shank as at 22 to rotate within the slot 16, to clear the arms 24 from the steering wheel spokes and bringing the minimized projecting portion of the head 23 between the portions of the steering wheel spokes previously engaged by said arms 24 and when this operation has been accomplished, the stem or shank and the head are lowered as shown by dotted lines in Fig. 3 and the attachment secured against loose movement through the medium of the same lock 17 and its tumbler, which is then caused to engage a single slot 31 in the side of the stem or shank 21 opposite to that having the slots 30 therein. It will also be understood that to render the clamp members proof against removal by unauthorized persons when the attachment is in locking position relatively to the steering wheel, the bolts and nuts 15 will be so constructed or treated that they cannot be readily detached and these bolts and nuts may also be replaced by any well known form of fastening means that would entirely defeat tampering with the application of the improved attachment.

In the form of the improved attachment shown by Figs. 6, 7 and 8, the essential features are the same, that is, the clamp secured to the column 8 and the stem or shank and head adjustable relative to the clamp for engagement with the spokes 6 of the steering wheel 5. In this modified structure the clamp is composed of a main member 32 with a half angular slot 33 therethrough and a semi-circular intermediate yoke or collar member 34. The one side of the clamping member 32 is slotted as at 35 between its opposite ends to provide outwardly projecting cover flanges 36 and 37 differing in dimensions in accordance with the difference of thickness of the opposite extremities of the said member, and in the slot 35 a closing member 38 is fitted and is formed with an intermediate semi-circular yoke or collar 39 to coincide with the yoke or collar 34 and also with a half slot 40 to register with the half slot 33 of the member 32. The half slots 33 and 40 extend fully through the members 32 and 38 and the two members are secured by cross bolts or any suitable connecting devices 41. The angular joint formation provided by the interfitting of the member 38 in the member 32 renders it difficult for any one to reach the complete slot formed by the half slots 33 and 40 and with the angular stem or shank 42 engaging the said combined half slots. In the modified structure shown by Figs. 6 to 8 there is no lock within the clamping member and the stem or shank 42 is essentially the same as that shown in connection with the first form of the improvement and has a head 43 of exactly the same contour as the head 23 heretofore described and also a reduced or cylindrical extremity 44 which permits the stem or shank to be rotated in the slot through the united members 32 and 38 when the said stem or shank is elevated high enough. The means for securing the stem or shank 42 in the modified structure consists of a shackle block 45 having a shackle 46 removably inserted through an opening 47 in the stem or shank 42. The lock 45 will also preferably be of the Yale type or any other analogous form of lock and by showing the two forms of the device and particularly the variation in the means for locking the stem or shank, it is intended to be understood that any preferred means applicable to the purpose may be employed for securing the stem or shank in engaging relation to the spokes of the steering wheel with such positiveness as to resist and defeat tampering with the improved attachment when it is disposed to hold the steering wheel against movement by unauthorized persons.

The improved attachment will be found exceptionally advantageous in that it is simple in construction and it may be readily applied to any of the various forms of steering posts and wheels, and in view of the minimized number of parts involved in the complete organization of the improvement, it may be cheaply manufactured. It is also proposed to construct the parts of the improved attachment entirely of metal, aluminum being preferably used in view of its lightness and durability. By the terms steering column hereinbefore referred to it will be understood that the well known device of this class is meant, such device comprising an outer stationary cylindrical member which is tubular as indicated by 8 in the accompanying drawings, and through which the usual steering rod rotatably extends and is attached or operatively associated at the opposite extremities with the steering wheel 5 and the steering mechanism.

What is claimed is:—

1. In a locking means for a steering wheel, the combination with a stering column, of a clamp fixed to the column and having an outwardly projecting retention member with a vertical opening therethrough of angular form, a locking device comprising a head and a shank, the shank having the upper part thereof constructed of the same angular contour in cross-section as the vertical opening in the projecting member and the lower portion circular in cross-section and of less diameter than the upper portion, to insure continual assemblage of the shank with the retention member and provide a leading means for the shank through the member when the shank is allowed to gravitate, whereby the shank may be inserted through the opening of the said member and held against rotation or be longitudinally shifted in a vertical direction and rotated in the said opening to turn the head of the shank either to engage or disengage the steering wheel, the head of the locking device having projecting means extending in opposite directions for locking engagement with the spokes of the steering wheel, and means for locking the shank and its head against movement in said member and also for locking the shank against movement when lowered in the member.

2. In a locking means for a steering wheel, the combination with a steering column, of a clamp immovably secured to the column and having a projecting retention member with a vertical angular opening therethrough, a locking device comprising a head and a shank, the shank having an upper angular portion corresponding in contour to the opening through the said member for holding the said shank against rotation and also formed with a reduced lower portion of circular contour in cross section and of less diameter than the angular opening to permit the shank to be longitudinally shifted vertically in the clamp opening and rotated by bringing the lower reduced portion of the shank into the opening, the head being formed with laterally projecting arms having lower curved beveled surfaces, the head projecting a greater distance at one side of the shank than at the opposite side thereof, whereby the shank may be shifted and turned to bring the arms of the head over two adjacent spokes of the steering wheel and held against longitudinal shifting movement in the opening or be permitted to longitudinally shift in the said opening for rotation of the shank to release the arms of the head from the steering wheel spokes, and means mounted in the member and having a shiftable locking device movable in a plane at right angles to the shank for engaging one side of the latter for locking the head against movement relatively to the steering wheel and clamp and another side for locking the shank in lowered disengaged position relatively to the steerwheel.

3. In a locking means for a steering wheel, the combination with a column and steering wheel, of a clamp secured to the column and formed with a projecting member having an angular opening therethrough, a locking device enclosed within the member and having locking means projectable into the said opening, and a locking device for the steering wheel comprising a head and a shank, the shank being formed with an upper portion of the same contour as the opening in the member to hold the shank against rotation in the clamp, the shank being also formed with a lower portion which is circular in cross-section and of less diameter than the upper portion to permit rotation of the shank in the member when said shank is longitudinally shifted vertically to bring the lower reduced portion thereof into the angular opening of the member, the shank also being formed with recesses in opposite sides at different elevations for engagement by the locking means which projects into the opening of the member towards and from the shank in a plane at right angles to the latter, the head of the shank being formed with oppositely-extending arms to engage over two of the adjacent spokes of the steering wheel.

4. In a locking means for a steering wheel, the combination with a column and steering wheel, a retention member secured to the column and having an angular opening extending therethrough, a locking device fully enclosed within the member and having a shiftable locking bolt projectable at right angles into and withdrawable from the said angular opening, and a locking device for the steering wheel comprising a head to engage adjacent spokes of the wheel and a shank having an upper portion of the same contour as the angular opening and movable in the latter and a lower portion of reduced diameter for rotation in the angular opening, the angular portion of the shank having means at opposite sides for engagement by the bolt of the locking device to hold the locking head of the shank at different elevations relatively to the steering wheel to prevent movement of the said locking head when in engagement with the steering wheel and also withdrawal of the steering wheel locking device from the retention member when the shank and its head are lowered.

5. In a locking means for a steering wheel, the combination with a column and steering wheel, of a projecting retention member secured to the column and having an angular opening therethrough, a lock enclosed within the retention member and having a bolt projectable into and withdrawable from the said angular opening, and a wheel locking means consisting of a head to engage the spokes of the wheel and a shank having the greater portion thereof of the same angular contour in cross section as the angular opening and a lower reduced portion, whereby the shank may have a sliding non-rotatable movement in the retention member and also a rotatable movement for disposing the wheel locking head at different elevations and for securing the wheel locking head and its shank both in its elevated locking position and also in its lowered position.

In testimony whereof I have hereunto set my hand in presence of two subscribing witnesses.

ALFONSO HOLMES DUNLAP.

Witnesses:
S. BARTOW STRANG,
J. S. FLETCHER.